US008077037B2

(12) United States Patent
Leyden et al.

(10) Patent No.: US 8,077,037 B2
(45) Date of Patent: Dec. 13, 2011

(54) SECURITY SYSTEM FOR A PORTABLE ARTICLE

(75) Inventors: Roger Leyden, Inverness, IL (US); Terrance Surma, Carol Stream, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 324 days.

(21) Appl. No.: 11/973,566

(22) Filed: Oct. 9, 2007

(65) Prior Publication Data

US 2009/0091448 A1 Apr. 9, 2009

(51) Int. Cl.

| | |
|---|---|
| ***G08B 13/12*** | (2006.01) |
| *G08B 1/00* | (2006.01) |
| *G08B 23/00* | (2006.01) |
| *G08B 13/14* | (2006.01) |
| *G08B 21/00* | (2006.01) |
| *H04W 4/00* | (2009.01) |
| *G10L 19/00* | (2006.01) |
| *H04M 11/04* | (2006.01) |

(52) U.S. Cl. .................. 340/568.2; 340/531; 340/573.4; 340/568.1; 340/630; 455/462; 704/500; 379/47

(58) Field of Classification Search ............... 340/568.2, 340/573.4, 568.8, 687; 455/404.1, 462
See application file for complete search history.

(56) References Cited

U.S. PATENT DOCUMENTS

| | | | | |
|---|---|---|---|---|
| 4,593,273 | A | 6/1986 | Narcisse | |
| 4,785,291 | A | 11/1988 | Hawthorne | |
| 5,043,702 | A | 8/1991 | Kuo | |
| 5,151,684 | A | 9/1992 | Johnsen | |
| 5,231,375 | A * | 7/1993 | Sanders et al. | 340/568.2 |
| 5,245,317 | A | 9/1993 | Chidley et al. | |
| 5,708,421 | A | 1/1998 | Boyd | |
| 5,838,234 | A | 11/1998 | Roulleaux-Robin | |
| 5,963,130 | A | 10/1999 | Schlager et al. | |
| 6,075,443 | A * | 6/2000 | Schepps et al. | 340/573.4 |
| 6,163,261 | A | 12/2000 | Westrick | |
| 6,888,456 | B2 | 5/2005 | Cheng et al. | |
| 7,075,445 | B2 * | 7/2006 | Booth et al. | 340/630 |
| 7,174,176 | B1 * | 2/2007 | Liu | 455/462 |
| 7,209,038 | B1 * | 4/2007 | Deconinck et al. | 340/568.8 |
| 7,231,200 | B2 * | 6/2007 | Jenkins | 455/404.1 |
| 7,327,276 | B1 * | 2/2008 | Deconinck et al. | 340/687 |
| 7,391,326 | B2 | 6/2008 | Puzio et al. | |
| 7,671,741 | B2 | 3/2010 | Lax et al. | |
| 2001/0034223 | A1 * | 10/2001 | Rieser et al. | 455/404 |
| 2002/0029147 | A1 * | 3/2002 | Parker | 704/500 |
| 2004/0155777 | A1 * | 8/2004 | Mitchell et al. | 340/568.1 |
| 2005/0139168 | A1 * | 6/2005 | Light et al. | 119/721 |
| 2005/0190059 | A1 * | 9/2005 | Wehrenberg | 340/571 |
| 2006/0267758 | A1 * | 11/2006 | Barth et al. | 340/539.1 |
| 2007/0229259 | A1 * | 10/2007 | Irmscher et al. | 340/568.2 |
| 2007/0275670 | A1 * | 11/2007 | Chen et al. | 455/73 |
| 2010/0127873 | A1 | 5/2010 | Scott et al. | |
| 2010/0214102 | A1 | 8/2010 | Yang | |

* cited by examiner

*Primary Examiner* — George Bugg
*Assistant Examiner* — Jack Wang
(74) *Attorney, Agent, or Firm* — Wood, Phillips, Katz, Clark & Mortimer

(57) ABSTRACT

A security system for portable articles is provided. The security system includes a central unit and one or more remote units. Each remote unit has a tethering system which attaches one or more portable articles to the remote unit. When a portable article is detached from the remote unit, a remote alarm signal is generated, which is conveyed to the central unit via a radiofrequency transmission. The central unit confirms receipt of an alarm transmission, and activates a dialer, which contacts one or more individuals via telephone.

25 Claims, 2 Drawing Sheets

SECURITY SYSTEM FOR A PORTABLE ARTICLE

TECHNICAL FIELD

The present invention relates generally to security systems, and, more particularly, to a security system utilizing a radiofrequency communications link between one or more remote units and a central alarm unit.

BACKGROUND OF THE INVENTION

The use of "hands on" displays at points of purchase is becoming increasingly popular, particularly in the electronics industry. Electronic devices are becoming more and more sophisticated, with a wide range of capabilities and features. Given the considerable potential investment in these devices, consumers have come to expect that they will be given the opportunity to hold and operate the devices as they would in the event of purchase. This is true of, among other types of products, cellular telephones, personal digital assistant devices (PDA's), digital music players, etc.

In many circumstances, it is impractical for potential customers to be given devices, one-by-one, and for any handling thereof to be monitored, as by a sales person. First of all, this practice could potentially require an inordinately large number of personnel, depending upon the number of products to be displayed and number of shoppers. Secondly, it is impractical to expect a sales force to keep track of all individual devices that are made available to prospective purchasers. This type of an environment is particularly attractive to thieves, recognizing that tracking of all devices made available to prospective consumers would be difficult, if not impossible. While safeguards have been devised at exits, through electronic sensing and/or strategic placement of security personnel and inspection of departing patrons, to a sophisticated thief, these normal safeguards may represent an insignificant impediment to theft.

Thus, the trend in the electronics industry has been to display most available products for inspection without requiring supervision by store personnel. Typically, security systems are employed in which sample articles are tethered to a display structure, such that prospective purchasers can handle each article within a range of the display structure corresponding to the length of the tether. The tether may include security sensors, which detect if the article is removed or the tether is cut. The security sensors are electrically connected via cabling back to a central security controller, which detects and responds to alarm conditions.

While tether-based security systems can be effective in permitting secure, unmonitored handling of portable articles, installation of such systems can be cumbersome, particularly to the extent that a number of tethered security displays may be utilized in various locations within a retail establishment, some or all of which locations may be remotely located from such an establishment's primary or desired location for security system controllers.

SUMMARY OF THE INVENTION

In accordance with one form of the invention, a security system includes a central unit and one or more remote units. Each remote unit includes a system for monitoring the status of portable articles as being secured or unsecured, such as a tethering system connecting one or more portable articles to the remote unit. The remote unit also includes an alarm circuit which can operate to generate a remote alarm signal if one or more portable articles is disconnected from the remote unit or otherwise identified as being in an unsecured condition. A radiofrequency ("RF") transmitter responds to the remote alarm signal by generating a RF transmission.

The central unit includes a RF receiver which receives the RF transmission and outputs a central alarm signal. In some embodiments, the RF receiver will require receipt of a plurality of RF transmissions before outputting the central alarm signal. A dialer responds to the central alarm signal by initiating one or more telephone connections via a telephone line, to report the disconnection of the portable article from the remote unit or other unsecured condition.

In some embodiments, a plurality of remote units can be provided, and the identity of the remote unit that generates the remote alarm signal can be conveyed via the remote alarm signal, such as via a main code that can be conveyed by the remote alarm signal. Additionally or alternatively, the tethering system can connect a plurality of portable articles to the remote unit, and the remote alarm signal can identify the specific portable article that is disconnected from the remote unit, such as via a box code that can also be conveyed by the remote alarm signal. In some forms, the main code and/or box code can be conveyed via the RF transmission, and included in the central alarm signal as well.

In some embodiments, a dialer within the central unit can be configured to initiate one or more telephone connections via the telephone line and play a predetermined audible message. In other embodiments, the dialer can be configured to play a selected one of a plurality of messages after initiating each of the one or more telephone connections via the telephone line. The message that is played can be selected based upon criteria such as the identity of the call recipient, or based upon which one of the one or more remote units generated the remote alarm signal.

DETAILED DESCRIPTION

Figure 1:
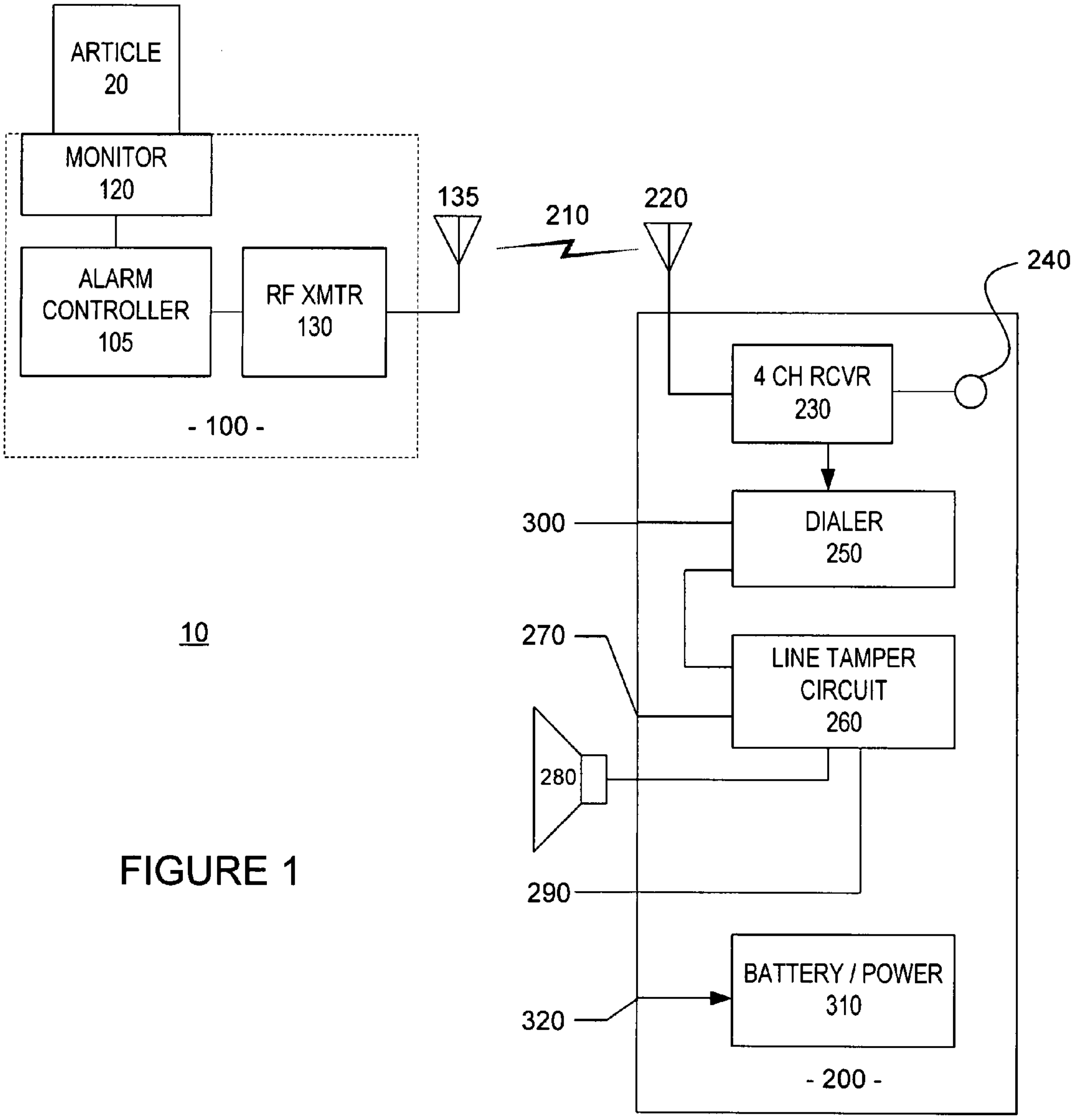
FIG. 1 is a diagrammatic block diagram of a security system, in accordance with one embodiment of the invention.

While this invention is susceptible of embodiment in many different forms, there are shown in the drawings and will herein be described in detail, certain specific embodiments with the understanding that the present disclosure should be considered as an exemplification of the principles of the invention and is not intended to limit the invention to the embodiments so illustrated or described.

Referring initially to FIG. 1, a security system, according to one embodiment, is shown at 10. Security system 10 is designed for portable articles, such as portable article 20. For example, in some applications, portable article 20 may include electronic articles that are commonly displayed at locations throughout a retail store in such a manner that the articles can be picked up and operated by a prospective purchaser. Security system 10 includes remote unit 100 and central unit 200. Remote unit 100 is adapted for localized placement within a retail establishment. For example, remote unit 100 can be located on or within a display counter at which tethered articles are made available for inspection.

Remote unit 100 includes alarm controller 105 and article monitor 120. Article monitor 120 determines whether article 20 is maintained in a secured or unsecured status. A variety of article monitoring mechanisms are known in the art, and can be implemented in connection with the system described herein. For example, one such mechanism is illustrated in the embodiment of FIG. 2.

Figure 2:
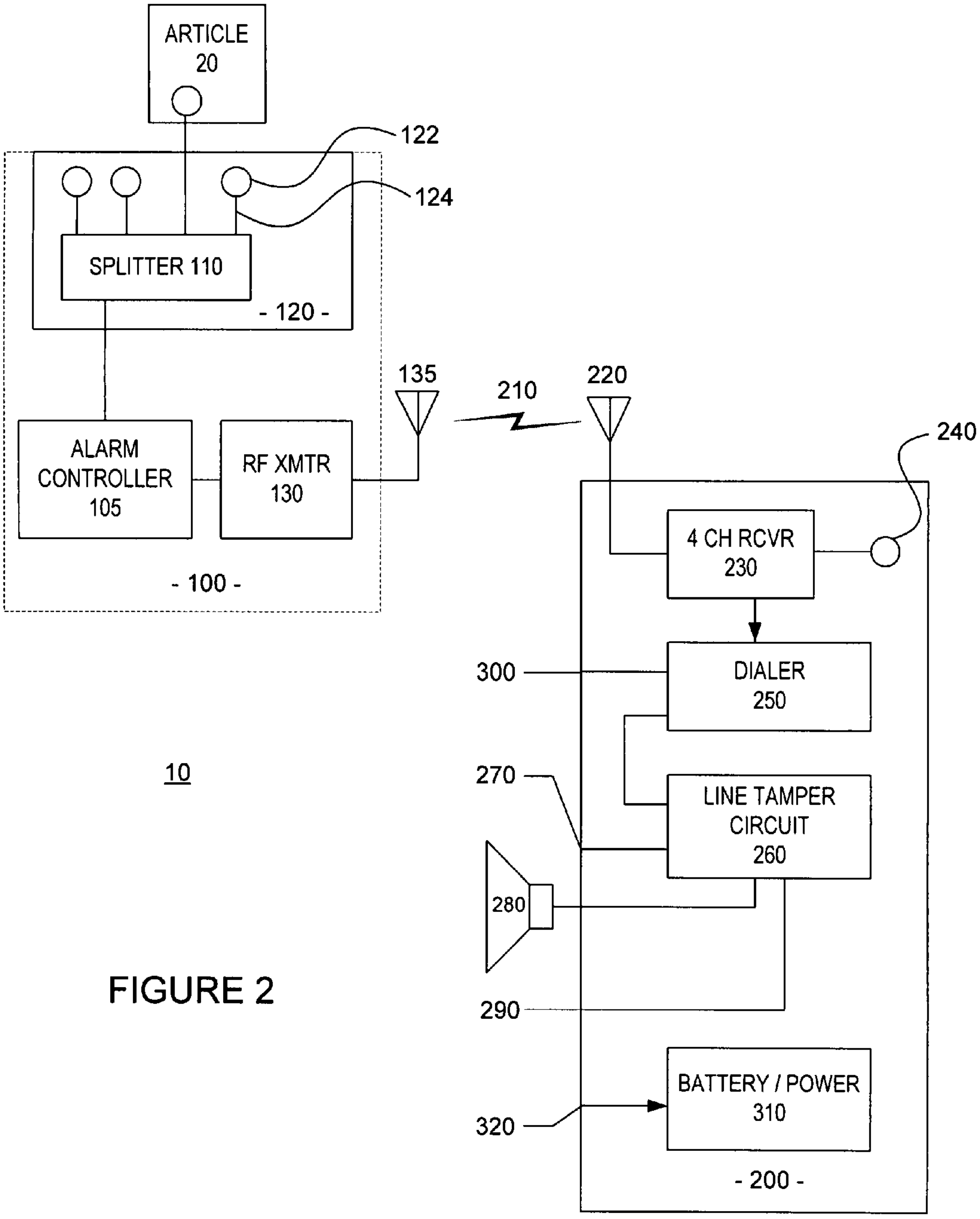
FIG. 2 is a diagrammatic block diagram of a security system, in accordance with another embodiment of the invention.

In the embodiment of FIG. 2, article monitor 120 includes a tethering system with a plurality of security sensors 122 designed for attachment to an article to be secured. Each of security sensors 122 is in turn linked to remote unit 100 by one of tethers 124. In some embodiments, tethers 124 may include a physical interconnection between sensor 122 and splitter 126, to which the status of sensor 122 is conveyed. One example of such a physical interconnection is a flexible cable or cord, which includes one or more electrically-conductive pathways, through which the status of sensor 122 can be conveyed to splitter 126 via electrical signaling. However, it is also understood that tethers 124 can be implemented via other means, such as a wireless communications link between sensor 122 and splitter 126, whereby the status of sensor 122 is communicated to splitter 126 via radiofrequency communications.

When sensor 122 is attached to portable article 20, a signal indicative of a secured status can be conveyed via tether 124. Other conditions may result in communication of a signal indicative of an unsecured status, such as removal of sensor 122 from article 20 or destruction of sensor 122. In embodiments having tethers that are implemented via physical interconnection, an unsecured status may also be indicated by the severing of tether 124. In embodiments having tethers implemented by wireless communications link, an unsecured status may also be indicated by interruption of the communications link, and/or movement of sensor 122 more than a predetermined distance away from splitter 126. Splitter 126 concatenates sensor signals from one or more tethers 124, such that the status of sensors 122 can be communicated to alarm controller 105.

In the embodiments of FIGS. 1 and 2, alarm controller 105 analyzes the status of article monitor 120. If a received signal is indicative of an alarm condition, alarm controller 105 sends an alarm notification signal to RF transceiver 130. The alarm notification signal preferably includes data descriptive of the particular alarm condition observed, such as the identification of a sensor and/or tether that has experienced an alarm condition, and/or the nature of the alarm.

In an exemplary embodiment, the alarm notification signal includes an 8-bit main code and a 4-bit box code. The 8-bit main code uniquely identifies remote unit 100, amongst the one or more remote units that may be utilized within a given system. The 4-bit box code uniquely identifies a sensor within a particular remote unit 100 that has experienced an alarm condition, such as, in the embodiment of FIG. 2, one of sensors 122. While the 8-bit main code and 4-bit box code, as described herein, can be implemented reliably and inexpensively, it is understood that other embodiments may utilize alternative types and formats for data and signaling.

After receiving an alarm notification signal, RF transceiver 130 generates a corresponding modulated RF signal, which is transmitted via antenna 135 to central unit 200 via wireless communications link 210. The RF signal is received at antenna 220 and conveyed to receiver 230. In an exemplary embodiment, receiver 230 is a four-channel receiver, whereby it is able to receive up to four alarm signals simultaneously. Accordingly, in embodiments having a plurality of remote units 100 associated with different merchandise displays, multiple alarm signals from different merchandise displays can be received simultaneously. In some such embodiments, each remote unit can be pre-assigned to one of the plurality of channels. In other embodiments, the remote unit transmitters can be configured to select one of the plurality of available channels prior to transmission.

Receiver 230 decodes the signal received from remote unit 100, towards making a determination as to whether an alarm condition exists, and an identification of the source of the alarm. In an exemplary embodiment, remote unit 100 operates to transmit the RF alarm signal via wireless communications link 210 periodically, throughout the duration of the alarm condition. Accordingly, receiver 230 can optionally be configured to require verification of any alarm condition before responding. For example, receiver 230 can be configured to require the receipt of three consistent transmissions, having matching 8-bit main codes and 4-bit box codes, either consecutively or within a predetermined period of time, before determining that the corresponding alarm condition is verified, such that it should be responded to by generating a central alarm signal.

Once a central alarm signal is generated, receiver 230 illuminates indicator 240 to provide a local indication that a verified alarm condition has occurred. In some embodiments, indicator 240 may include a light emitting diode. In other embodiments, indicator 240 may include a multi-segment LCD display which can provide information descriptive of the particular alarm condition that has occurred. In yet other embodiments, indicator 240 may provide an audible alert of an alarm condition, in combination with or instead of a visual alert.

Receiver 230 also responds to receipt of a verified alarm condition by triggering a relay, which conveys a responsive signal to telephone dialer 250. While the functions of receiving a RF transmission, verifying an alarm condition, and generating alarm signals in response thereto are described and depicted in the diagrammatic view of FIGS. 1 and 2 as being implemented by a single unit, receiver 230, it is contemplated and understood that receiver 230, as with other components of FIGS. 1 and 2, can also be implemented by use of a plurality of distributed circuits or electronic components.

Dialer 250 can be configured to place a telephone call via line tamper circuit 260 and telephone line 270 in response to an alarm condition. In an exemplary embodiment, dialer 250 can place a plurality of telephone calls to up to eight different numbers. Each call can be configured to convey one of a plurality of different messages. For example, four different messages can be preconfigured, and selected by dialer 250 based upon factors such as the identity of the remote unit that has generated the alarm, and/or the identity of the call recipient.

Line tamper circuit 260 operates to monitor the connection to telephone line 270. For example, line tamper circuit 260 identifies low voltage, open circuit or other abnormal line condition which may be indicative of telephone line failure, tampering or cutting. Preferably, line tamper circuit 260 requires an abnormal line condition to be experienced for a predetermined period of time, such as 17 seconds, before verifying the condition and responding. Once the abnormal line condition is verified, an audible external horn 280 is sounded, thus providing individuals on-site with a prominent notification that telephone line 270 is likely disabled, such that alarm conditions may not be reported properly. Optionally, line tamper circuit 260 also includes signal output 290, which can be tied to an alarm system such as a premises alarm system, providing an alternative means of reporting an abnormal line condition.

Dialer 250 further includes telephone line through-connection 300, to which a local telephone handset can be connected. During periods in which no verified alarm conditions have been detected, through-connection 300 provides a pathway through which a local handset can access telephone line 270 for general usage. When a verified alarm condition is detected, or when dialer 250 is otherwise ready to place a call on telephone line 270, dialer 250 seizes the line and deactivates through-connection 300, such that a telephone connected to through-connection 300 cannot be picked up and manipulated via button pressing or other actions, to interrupt an outbound call placed by dialer 250 on line 270.

Central unit 200 is preferably provided with power and battery backup subsystem 310. During normal operation, subsystem 310 receives power from external power connection 320, to operate central unit 200 and charge a backup battery integral to subsystem 310. If power to external connection 320 is interrupted or corrupted, the integral backup battery can be automatically employed to power central unit 200 and maintain its operation.

The foregoing description and drawings merely explain and illustrate the invention and the invention is not limited thereto, inasmuch as those skilled in the art, having the present disclosure before them will be able to make modifications and variations therein without departing from the scope of the invention.

What is claimed is:

1. A security system for portable articles, the security system comprising:

one or more remote units, each comprising a tethering system adapted to connect one or more portable articles to the remote unit, an alarm circuit which can operate to generate a remote alarm signal if one or more of the portable articles is disconnected from the remote unit, and a RF transmitter which receives the remote alarm signal and responds by generating a RF transmission; and a central unit, comprising a RF receiver which receives the RF transmission and outputs a central alarm signal, and a dialer which responds to the central alarm signal by initiating one or more telephone connections via a telephone line, whereby the disconnection of the portable article from the remote unit can be reported via the telephone connection, wherein the central unit causes a first predetermined message from a plurality of different available messages to be transmitted over the telephone lines, the first predetermined message selected based upon at least one of: a) a recipient associated with the telephone line connection; b) an identity of at least one remote unit at which a remote alarm signal is generated; and c) an identity of a portable article disconnected from the at least one remote unit.

2. The security system of claim 1, the system comprising a plurality of remote units, wherein the remote alarm signal comprises a first code that identifies which of the plurality of remote units has generated the alarm signal.

3. The security system of claim 2, in which the tethering system connects a plurality of portable articles to each remote unit, and wherein the remote alarm signal comprises a second code that identifies which of the portable articles is disconnected from a respective remote unit.

4. The security system of claim 3, in which the central alarm signal comprises the first code and second code.

5. The security system of claim 4, in which the central unit RF receiver decodes the RF transmissions and verifies that all RF transmissions have matching codes for each of the plurality of consistent RF transmissions before outputting a central alarm signal.

6. The security system of claim 1, in which the first predetermined message is an audible message.

7. The security system of claim 1, in which the first predetermined message is selected from amongst the plurality of different messages that are each audible messages.

8. The security system of claim 7, in which the first predetermined message is selected based at least in part upon a recipient associated with the first telephone connection.

9. The security system of claim 7, in which the first predetermined message is selected based at least in part upon the identity of a first remote unit from amongst the one or more remote units, at which a remote alarm signal is detected.

10. The security system of claim 1, further comprising one or more portable articles connected to the tethering system.

11. The security system according to claim 1 wherein the tethering system comprises a cable or cord that defines an electrically-conductive pathway and disconnection of the one of the articles comprises an interruption of the electrically-conductive pathway.

12. The security system of claim 1 wherein the central unit RF receiver requires receipt of a plurality of consistent RF transmissions, either consecutively or within a predetermined period of time, evidencing through the plurality of consistent RF transmissions that a same one of the portable articles is disconnected from the remote unit, before outputting a central alarm signal.

13. A security system for portable articles, the security system comprising:

one or more remote units comprising one or more sensors connected to and for monitoring the condition of one or more portable articles as secure or unsecure with the one or more portable articles at its respective remote unit, each remote unit further comprising an alarm circuit which can operate to generate a remote alarm signal if one or more of the sensors detects an unsecure condition for one or more of the portable articles with the one or more portable articles at its respective remote unit, and a RF transmitter which receives the remote alarm signal and responds by generating a RF transmission; and a central unit, comprising a RF receiver which receives the RF transmission and outputs a central alarm signal, and a dialer which responds to the central alarm signal by initiating one or more telephone connections via a telephone line, the dialer having a telephone line through-connection to which a local telephone handset can access the telephone line for general usage, whereby the unsecure condition of a portable article at the remote unit can be reported via the telephone connection, wherein upon receipt of an RF transmission indicative of an alarm condition, the dialer deactivates the through-connection and seizes the telephone line, wherein the security system further comprises a line tamper circuit to monitor connection to the telephone line, the line tamper circuit causing the generation of a detectable alarm in the event an abnormal telephone line condition is detected.

14. The security system of claim 13, the system comprising a plurality of remote units, wherein the remote alarm signal comprises:

a first code that identifies one of the one or more remote units as having generated the alarm signal; and a second code that identifies which of the portable articles is in an unsecure condition at its respective remote unit.

15. The security system of claim 14, in which the central alarm signal comprises the first code and second code.

16. The security system of claim 13, in which the dialer plays a predetermined audible message after initiating each of the one or more telephone connections via the telephone line.

17. The security system of claim 13, further comprising one or more portable articles monitored by the one or more sensors and there is a cable or cord that connects the one portable article to its respective remote unit.

18. A method for reporting the security status of a portable article by a security system having one or more remote units and a central unit, the method comprising the steps of:

monitoring the status of one or more sensors associated with a remote unit, each of the one or more sensors monitoring the status of a portable article as secured or unsecured;

generating a first remote alarm signal in response to detection of a first sensor as having an unsecured status;

generating a second remote alarm signal in response to continued detection of the first sensor as having the unsecured status;

transmitting first and second RF alarm signals by the remote unit in response to the first and second remote alarm signals;

receiving the first and second RF alarm signals by the central unit; and indicating an alarm condition by the central unit only upon receiving both the first and second RF alarm signals either consecutively or within a predetermined period of time, wherein the central unit causes a first predetermined message from a plurality of different available messages to be transmitted over the telephone lines, the first predetermined message selected based upon at least one of: a) a recipient associated with the telephone line connection; b) an identity of at least one remote unit at which a remote alarm signal is generated; and c) an identity of a portable article disconnected from the at least one remote unit.

wherein the central unit causes a first predetermined message from a plurality of different available messages to be transmitted over the telephone lines, the first predetermined message selected based upon at least one of: a) a recipient associated with the telephone line connection; b) an identity of at least one remote unit at which a remote alarm signal is generated; and c) an identity of a portable article disconnected from the at least one remote unit.

19. The method of claim 18, in which the step of transmitting a RF alarm signal is comprised of the step of transmitting a RF alarm signal conveying:

information indicative of which of the one or more remote units transmitted the alarm signal; and information indicative of which of the one or more sensors detected an unsecured status.

20. The method of claim 18, in which the step of indicating an alarm condition is comprised of the step of generating a visual alert indicative of the remote unit from which the RF alarm signal was received.

21. The method of claim 18, in which the step of indicating an alarm condition is comprised of the step of initiating a communications link over a telephone line connection, through which alert information is transmitted indicating the detection of an unsecured condition.

22. The method of claim 21, in which the step of indicating an alarm condition is further comprised of the step of conveying alert information which includes an audible message describing the alarm condition.

23. The method of claim 22 wherein the audible message is different and selected based upon at least one of: a) a recipient associated with the telephone line connection; and b) an identity of the remote unit at which a remote alarm signal is generated.

24. The method of claim 23 wherein the audible message is sent to a plurality of different recipients.

25. The method of claim 23 wherein different audible messages are sent to different recipients for one of the remote alarm signals.

* * * * *

UNITED STATES PATENT AND TRADEMARK OFFICE

CERTIFICATE OF CORRECTION

PATENT NO. : 8,077,037 B2
APPLICATION NO. : 11/973566
DATED : December 13, 2011
INVENTOR(S) : Leyden et al.

It is certified that error appears in the above-identified patent and that said Letters Patent is hereby corrected as shown below:

Col. 7, line 5-22, Claim 18 should read as follows:

18. A method for reporting the security status of a portable article by a security system having one or more remote units and a central unit, the method comprising the steps of:

monitoring the status of one or more sensors associated with a remote unit, each of the one or more sensors monitoring the status of a portable article as secured or unsecured;

generating a first remote alarm signal in response to detection of a first sensor as having an unsecured status;

generating a second remote alarm signal in response to continued detection of the first sensor as having the unsecured status;

transmitting first and second RF alarm signals by the remote unit in response to the first and second remote alarm signals;

receiving the first and second RF alarm signals by the central unit; and indicating an alarm condition by the central unit only upon receiving both the first and second RF alarm signals within a predetermined period of time, wherein the central unit causes a first predetermined message from a plurality of different available messages to be transmitted over the telephone lines, the first predetermined message selected based upon at least one of: a) a recipient associated with the telephone line connection; b) an identity of at least one remote unit at which a remote alarm signal is generated; and c) an identity of a portable article disconnected from the at least one remote unit.

Signed and Sealed this
Sixth Day of March, 2012

David J. Kappos
*Director of the United States Patent and Trademark Office*